US012730570B2

(12) United States Patent
Lee et al.

(10) Patent No.: US 12,730,570 B2
(45) Date of Patent: Sep. 8, 2026

(54) STORAGE SYSTEM USING MAPPING INFORMATION AND CLOUD SYSTEM INCLUDING THE SAME

(71) Applicant: Samsung Electronics Co., Ltd., Suwon-si (KR)

(72) Inventors: Wonchul Lee, Suwon-si (KR); Sungkyu Park, Suwon-si (KR); Seohyun Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/928,770

(22) Filed: Oct. 28, 2024

(65) Prior Publication Data

US 2025/0173076 A1 May 29, 2025

(30) Foreign Application Priority Data

Nov. 27, 2023 (KR) ........................ 10-2023-0167155

(51) Int. Cl.
*G06F 3/06* (2006.01)

(52) U.S. Cl.
CPC .......... *G06F 3/0631* (2013.01); *G06F 3/0604* (2013.01); *G06F 3/0679* (2013.01)

(58) Field of Classification Search
CPC ..... G06F 3/0631; G06F 3/0604; G06F 3/0679
USPC .......................................................... 711/163
See application file for complete search history.

(56) References Cited

U.S. PATENT DOCUMENTS 9,043,613 B2 5/2015 Shapiro
10,380,026 B2 8/2019 Sundararaman et al.
10,922,420 B2 * 2/2021 Allo .................... G06F 21/6218
11,042,661 B2 6/2021 Ben Dayan et al.
11,526,618 B2 12/2022 Jannyavula Venkata
11,669,252 B1 6/2023 Morita et al.
2022/0291873 A1 * 9/2022 Anchi .................. G06F 3/0689
2023/0004311 A1 1/2023 Kobayashi (Continued)

FOREIGN PATENT DOCUMENTS

KR 10-2021-0097016 A 8/2021
KR 10-2023-0094308 A 6/2023
WO 2022-157793 A1 7/2022

OTHER PUBLICATIONS

Ian F. Adams, John Keys, and Michael P. Mesnier. 2019. Respecting the block interface—computational storage using virtual objects. In Proceedings of the 11th USENIX Conference on Hot Topics in Storage and File Systems (HotStorage'19). USENIX Association, USA, 10.

*Primary Examiner* — Than Nguyen

(74) *Attorney, Agent, or Firm* — Fish & Richardson P.C.

(57) ABSTRACT

A storage system includes a plurality of storage devices including a plurality of user storage spaces allocated to each of a plurality of users, a controller configured to receive mapping information, which is information about the plurality of user storage spaces, from an external computing device that performs an operation for each of the plurality of users through a plurality of virtual machines, and a memory storing the mapping information, wherein the controller is configured to generate, when receiving the mapping information, different user keys for each of the plurality of user storage spaces, based on the mapping information, and manage user data stored in the plurality of storage devices by using the mapping information and user keys.

20 Claims, 10 Drawing Sheets

| MAPPING INFORMATION | | | | | | User Key |
|---|---|---|---|---|---|---|
| USS ID | CD ID | VM ID | SS ID | SD ID | LBA | |
| 1 | 1 | 1 | 1 | 1 | 0~0x0FFF | A1 / A2 |
| | 1 | 1 | 1 | 2 | 0~0x0FFF | |
| 2 | 1 | 2 | 1 | 1 | 0x1000~0x1FFF | B1 / B2 / B3 |
| | 1 | 2 | 1 | 3 | 0~0x0FFF | |
| | 1 | 2 | 1 | 4 | 0~0x0FFF | |
| 3 | 1 | 3 | 1 | 2 | 0x1000~0x1FFF | C1 / C2 / C3 |
| | 1 | 3 | 1 | 3 | 0x1000~0x1FFF | |
| | 1 | 3 | 1 | 4 | 0x1000~0x1FFF | |

(56) References Cited

U.S. PATENT DOCUMENTS

2023/0195308 A1 6/2023 Uhm et al.
2023/0205936 A1 6/2023 Lazar

* cited by examiner

FIG. 4

| MAPPING INFORMATION | | | | | | User Key |
|---|---|---|---|---|---|---|
| USS ID | CD ID | VM ID | SS ID | SD ID | LBA | |
| 1 | 1 | 1 | 1 | 1 | 0~0x0FFF | A1 / A2 |
| | 1 | 1 | 1 | 2 | 0~0x0FFF | |
| 2 | 1 | 2 | 1 | 1 | 0x1000~0x1FFF | B1 / B2 / B3 |
| | 1 | 2 | 1 | 3 | 0~0x0FFF | |
| | 1 | 2 | 1 | 4 | 0~0x0FFF | |
| 3 | 1 | 3 | 1 | 2 | 0x1000~0x1FFF | C1 / C2 / C3 |
| | 1 | 3 | 1 | 3 | 0x1000~0x1FFF | |
| | 1 | 3 | 1 | 4 | 0x1000~0x1FFF | |

STORAGE SYSTEM USING MAPPING INFORMATION AND CLOUD SYSTEM INCLUDING THE SAME

CROSS-REFERENCE TO RELATED APPLICATION

This application is based on and claims priority under 35 U.S.C. § 119 to Korean Patent Application No. 10-2023-0167155, filed on Nov. 27, 2023, in the Korean Intellectual Property Office, the disclosure of which is incorporated by reference herein in its entirety.

BACKGROUND

Inventive concepts relate to a storage system using mapping information.

As non-volatile memory, flash memory may retain stored data even when the power is turned off, and storage devices including flash memory, such as solid-state drives (SSDs) and memory cards, are widely used.

Recently, research is being actively conducted on a large-capacity storage system including a plurality of storage devices in order to provide space for storing data to a plurality of users. Such a storage system may be accessed by a plurality of users, and thus, management and protection of user data stored by a plurality of users are important (or beneficial). To this end, various methods are being developed for storage regions of user data of each of a plurality of users, and methods for encrypting user data.

SUMMARY

Various example embodiments of inventive concepts provide a storage system that manages user data by using mapping information.

Some example embodiments of inventive concepts provide a storage system includes a plurality of storage devices including a plurality of user storage spaces allocated to each of a plurality of users, a controller configured to receive mapping information about the plurality of user storage spaces, from an external computing device configured to perform an operation for each of the plurality of users through a plurality of virtual machines, and a memory configured to store the mapping information, wherein the controller is configured to generate different user keys for each of the plurality of user storage spaces, based on the mapping information, in response to the controller receiving the mapping information, and wherein the controller is further configured to manage user data stored in the plurality of storage devices by using the mapping information and the user keys.

Some example embodiments of inventive concepts provide a storage system includes a plurality of storage devices including a plurality of user storage spaces allocated to each of a plurality of users, a controller configured to transmit a mapping information request to an external computing device that performs an operation for each of the plurality of users through a plurality of virtual machines, in response to the storage system being reset or rebooted, receive mapping information about the plurality of user storage spaces, from the computing device, generate different user keys for each of the plurality of user storage spaces, based on the mapping information, and manage user data stored in the plurality of storage devices by using the mapping information and the user keys, and a memory storing the mapping information.

Some example embodiments of inventive concepts provide a cloud system includes a plurality of storage systems configured to store user data of each of a plurality of users, and a plurality of computing devices configured to perform an operation for each of the plurality of users through a plurality of virtual machines and transmit to the plurality of storage systems, mapping information about a plurality of user storage spaces allocated to each of the plurality of users, wherein the plurality of storage systems include a plurality of storage devices including the plurality of user storage spaces allocated to each of the plurality of users, a controller configured to generate different user keys for each of the plurality of user storage spaces, based on the mapping information, and manage user data stored in the plurality of storage devices by using the mapping information and the user keys, in response to the controller receiving the mapping information, and a memory storing the mapping information.

BRIEF DESCRIPTION OF THE DRAWINGS

Various example embodiments will be more clearly understood from the following detailed description taken in conjunction with the accompanying drawings in which:

FIG. 4 is a diagram of an example of mapping information and user keys, which are used in a storage system, according to an example embodiment;

DETAILED DESCRIPTION OF THE EMBODIMENTS

Hereinafter, various example embodiments of inventive concepts will be described in detail with reference to the accompanying drawings.

Figure 1:
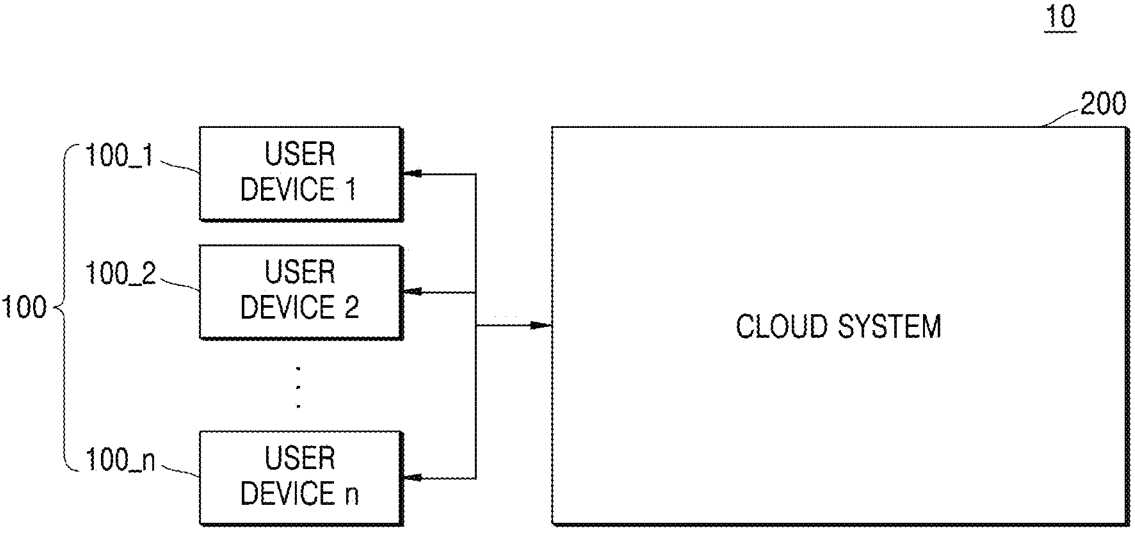
FIG. 1 is a block diagram of a cloud system and a peripheral configuration, according to an example embodiment.

FIG. 1 is a block diagram of a cloud system and a peripheral configuration, according to an example embodiment.

Referring to FIG. 1, a system 10 may include a plurality of user devices 100 and a cloud system 200.

The plurality of user devices 100 are electronic devices used by users and may perform various operations related to data. The plurality of user devices 100 may include first to $n^{th}$ user devices 100_1 to **100_*n* (wherein n is a natural number of 2 or more), and the first to $n^{th}$ user devices 100_1 to 100_*n*** may be respectively used by first to $n^{th}$ users.

In an example embodiment, the plurality of user devices 100 may be any one of smartphones, tablet PCs, smart TVs, portable phones, personal digital assistants (PDAs), laptops, media players, micro servers, global positioning system (GPS) devices, e-book readers, digital broadcasting terminals, navigation devices, kiosks, MP3 players, digital cameras, home appliances, and other mobile or non-mobile computing devices, but example embodiments are not limited thereto. In addition, the plurality of user devices 100 may be wearable devices, such as watches, glasses, hairbands, and rings, each equipped with data processing functions, but example embodiments are not limited thereto, and the plurality of user devices 100 may include all types of devices that operate based on an operating system (OS) by using a processor.

The plurality of user devices 100 may store data in the cloud system 200 and retrieve data stored in the cloud system 200. The plurality of user devices 100 may transmit, to the cloud system 200, various requests, such as a user sign-up request, a data write request, a data read request, a user withdrawal request, etc.

The user sign-up request may be a request to allocate space for a user to store data in the cloud system 200. The data write request may be a request to store data in the cloud system 200. The data read request may be request to transmit at least some of data stored in the cloud system 200. The user withdrawal request may be a request to remove all information and data related to a user, which are stored in the cloud system 200, because the user is no longer using the cloud system 200.

The cloud system 200 may be a system that stores data used by the plurality of user devices 100. The cloud system 200 may store data according to requests from the plurality of user devices 100 and may read data according to requests from the plurality of user devices 100 and transmit the data.

The cloud system 200 may include a plurality of computing devices and a plurality of storage systems. A more detailed structure of the cloud system 200 may be described in more detail with reference to FIG. 2.

Figure 2:
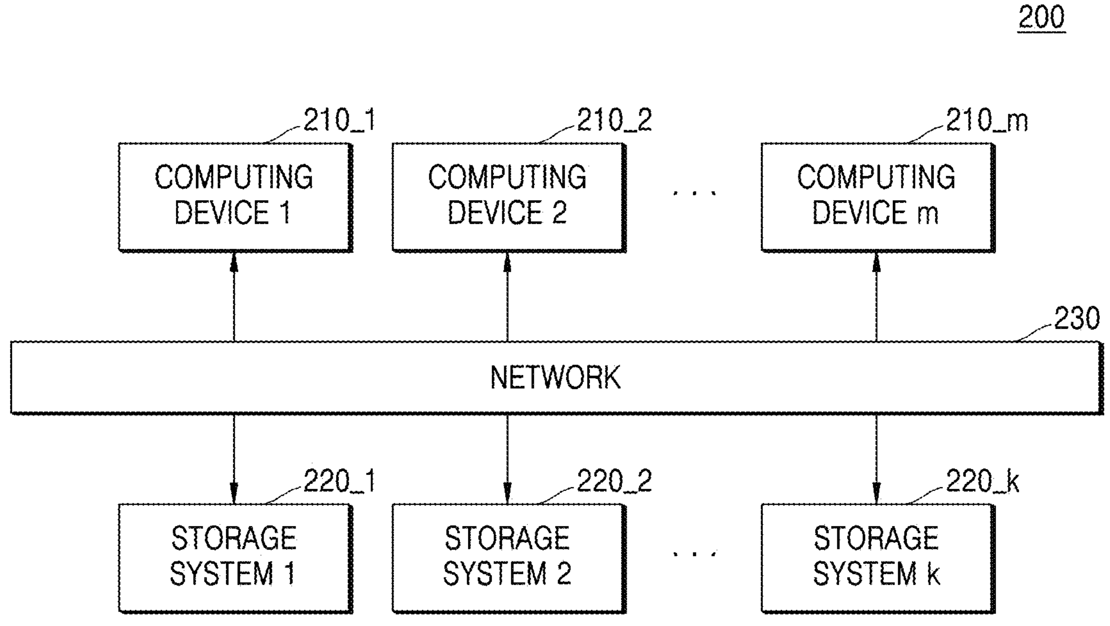
FIG. 2 is a block diagram of a cloud system according to an example embodiment.

FIG. 2 is a block diagram of a cloud system according to an example embodiment.

Referring to FIG. 2, the cloud system 200 according to an example embodiment may include a plurality of computing devices 210 and a plurality of storage systems 220. In addition, the cloud system 200 according to an example embodiment may include a network 230.

The plurality of computing devices 210 may communicate with the plurality of user devices 100. The plurality of computing devices 210 may include first to $m^{th}$ computing devices 210_1 to **210_*m*** (wherein m is a natural number of 2 or more).

The plurality of computing devices 210 may operate based on requests received from the plurality of user devices 100. The plurality of computing devices 210 may perform operations for each of a plurality of users through a plurality of virtual machines.

The plurality of virtual machines may be included in any one of the plurality of computing devices 210. The plurality of virtual machines may process requests received from the plurality of user devices 100. The number of virtual machines may be the same as the number of user devices, and the number of virtual machines may be n in the example embodiment of FIG. 1. Therefore, each of the plurality of virtual machines may process requests received from each of the plurality of user devices 100, and for example, a first virtual machine among the plurality of virtual machines may process a request received from the first user device 100_1.

The plurality of computing devices 210 may receive a user sign-up request from any one of the plurality of user devices 100. For example, the plurality of computing devices 210 may receive a user sign-up request from the first user device 100_1 among the plurality of user devices 100.

Any one of the plurality of computing devices 210 may create a virtual machine therein in response to receiving the user sign-up request. For example, the first computing device 210_1 among the plurality of computing devices 210 may create the first virtual machine therein in response to receiving a user sign-up request from the first user device 100_1. In some example embodiments, the first virtual machine may process a request received from the first user device 100_1.

A virtual machine created in response to a user sign-up request may allocate user storage space within the plurality of storage systems 220 and may generate mapping information. The user storage space may be space storing user data used by a user. The mapping information may be information about the user storage space.

For example, the first virtual machine created in response to receiving a user sign-up request from the first user device 100_1 may allocate, as user storage space, a specific logic block address within a plurality of storage devices (or alternative referred to as a plurality of non-transitory storage devices) in the plurality of storage systems 220. In some example embodiments, the first virtual machine may allocate the user storage space across the plurality of storage devices (or the plurality of non-transitory storage devices). The first virtual machine may generate mapping information indicating where the allocated user storage space is.

The virtual machine created in response to the user sign-up request may transmit the generated mapping information to the plurality of storage systems 220.

The plurality of computing devices 210 may receive a data write request or a data read request from any one of the plurality of user devices 100. The plurality of computing devices 210 may transmit the data write request or the data read request to the plurality of storage systems 220.

The plurality of computing devices 210 may receive a user withdrawal request from any one of the plurality of user devices 100. For example, the plurality of computing devices 210 may receive a user withdrawal request from the first user device 100_1 among the plurality of user devices 100.

In response to receiving the user withdrawal request, the plurality of computing devices 210 may remove therefrom a virtual machine that processes a request related to a user, which corresponds to the user withdrawal request. For example, the plurality of computing devices 210 may remove the first virtual machine therefrom in response to receiving a user withdrawal request from the first user device 100_1 among the plurality of user devices 100.

The plurality of computing devices 210 may transmit user withdrawal requests to the plurality of storage systems 220.

The plurality of storage systems 220 may store data of a plurality of users. The plurality of storage systems 220 may include first to kth storage systems 220_1 to **220_*k*** (wherein k is a natural number of 2 or more).

The plurality of storage systems 220 may operate based on requests received from the plurality of computing devices 210. For example, when receiving data write requests from the plurality of computing devices 210, the plurality of storage systems 220 may store user data of a plurality of users (or the plurality of storage systems 220 may store user data of a plurality of users, in response to plurality of storage systems 220 receiving data write requests from the plurality of computing devices 210).

In an example embodiment, when receiving mapping information from the plurality of computing devices 210, the plurality of storage systems 220 generate user keys based on the mapping information, and may manage user data to be stored in the plurality of storage devices (or the plurality of non-transitory storage devices) by using the mapping information and the user keys (or the plurality of storage systems 220 generate user keys based on the mapping information, and may manage user data to be stored in the plurality of storage devices by using the mapping information and the user keys, in response to the storage systems 220 receiving mapping information from the plurality of computing devices 210).

In an example embodiment, when receiving data write requests from the plurality of computing devices 210, the plurality of storage systems 220 may encrypt write data corresponding to the data write requests by using user keys, and may write the encrypted write data to the plurality of storage devices (or the plurality of non-transitory storage devices), based on mapping information (or the plurality of storage systems 220 may encrypt write data corresponding to the data write requests by using user keys, and may write the encrypted write data to the plurality of storage devices, based on mapping information, in response to the plurality of storage systems 220 receiving data write requests from the plurality of computing devices 210).

In an example embodiment, when reading data write requests from the plurality of computing devices 210, the plurality of storage systems 220 may read encrypted read data corresponding to the data read requests from the plurality of storage devices (or the plurality of non-transitory storage devices), based on mapping information, may decrypt the encrypted read data by using user keys, and may transmit the decrypted read data to the plurality of computing devices 210 (or the plurality of storage systems 220 may read encrypted read data corresponding to the data read requests from the plurality of storage devices, based on mapping information, may decrypt the encrypted read data by using user keys, and may transmit the decrypted read data to the plurality of computing devices 210, in response to the plurality of storage systems 220 reading write requests from the plurality of computing devices 210).

In an example embodiment, when receiving user withdrawal requests from the plurality of computing devices 210, the plurality of storage systems 220 may remove mapping information, user keys, and user data, which correspond to the user withdrawal requests (or the plurality of storage systems 220 may remove mapping information, user keys, and user data, which correspond to the user withdrawal requests, in response to the plurality of storage systems 220 receiving user withdrawal requests from the plurality of computing devices 210).

More detailed structures and operations of each of the plurality of computing devices 210 and the plurality of storage systems 220 are described in more detail with reference to FIG. 3 and other drawings.

The network 230 may wireless connect the plurality of computing devices 210 to the plurality of storage systems 220. The network 230 may be used as a transmission path for requests, data, etc. between the plurality of computing devices 210 and the plurality of storage systems 220.

Figure 3:
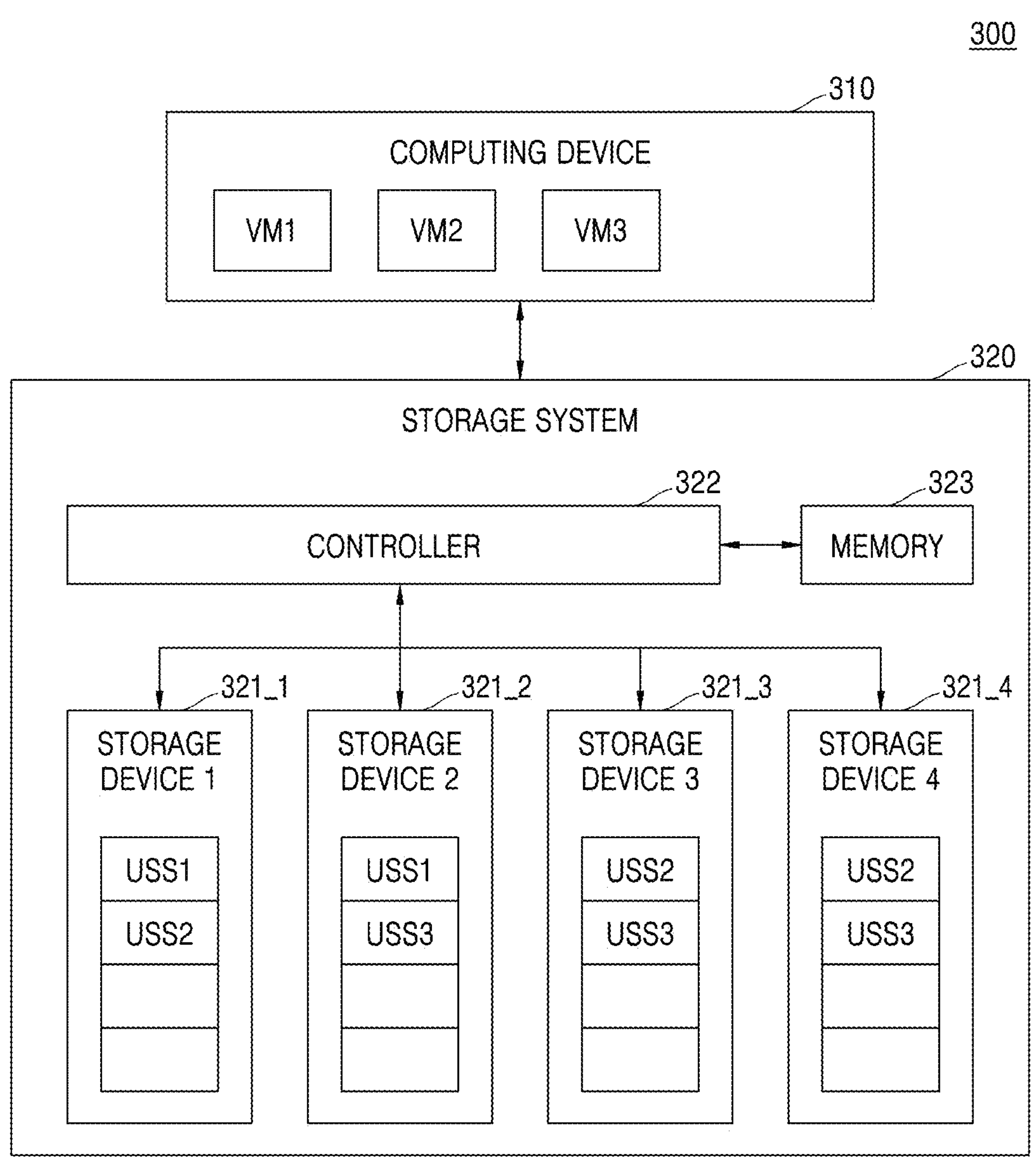
FIG. 3 is a block diagram of detailed structures of a computing device and a storage system, which are included in a cloud system, according to an example embodiment.

FIG. 3 is a block diagram of detailed structures of a computing device and a storage system, which are included in a cloud system, according to an example embodiment.

Referring to FIG. 3, a cloud system 300 according to an example embodiment may include a computing device 310 and a storage system 320. The computing device 310 shown in FIG. 3 may be any one of the first to $m^{th}$ computing devices 210_1 to **210_*m* shown in FIG. 2. In addition, the storage system 320 shown in FIG. 3 may be any one of the first to kth storage systems 220_1 to 220_*k* shown in FIG. 2. FIG. 3 shows an example embodiment in which the cloud system 300 includes one computing device 310 and one storage system 320, but example embodiments are not limited thereto. For example, the cloud system 300** may include a plurality of computing devices and a plurality of storage systems.

The computing device 310 may include a plurality of virtual machines. In the example embodiment of FIG. 3, the computing device 310 may include first to third virtual machines VM1 to VM3.

The computing device 310 may create the first to third virtual machines VM1 to VM3 in response to user sign-up requests received from the first to third user devices 100_1 to 100_3, respectively. For example, the computing device 310 may create the first virtual machine VM1 in response to a user sign-up request received from the first user device 100_1.

The first to third virtual machines VM1 to VM3 may perform operations for first to third users, respectively. For example, the first virtual machine VM1 may perform an operation for the first user, based on a request receiving from the first user device 100_1. The computing device 310 may transmit a request to the storage system 320 in response to requests related to the first to third users through the first to third virtual machines VM1 to VM3.

The computing device 310 may create the first to third virtual machines VM1 to VM3 and then allocate first to third user storage spaces USS1 to USS3 within the storage system 320. For example, the computing device 310 may create the first virtual machine VM1 and then allocate the first user storage space USS1 inside the storage system 320.

The computing device 310 may allocate the first to third user storage spaces USS1 to USS3 and then generate mapping information. The mapping information may include information about the first to third user storage spaces USS1 to USS3 allocated to each of a plurality of users.

The computing device 310 may transmit the mapping information to the storage system 320. In some example embodiments, the computing device 310 may transmit the mapping information to the storage system 320 by using a command line interface (CLI), a representational state transfer (RESTful) application programming interface (API), etc.

The storage system 320 may store data about the first to third users. The storage system 320 may be wirelessly connected to the computing device 310 through a network.

The storage system 320 may include a plurality of storage devices (or alternatively referred to as a plurality of non-transitory storage devices), a controller 322, and a memory 323. FIG. 3 shows an example embodiment in which the plurality of storage devices (or the plurality of non-transitory storage devices) includes four storage devices by including first to fourth storage devices 321_1 to 321_4, but inventive concepts are not limited thereto, and the plurality of storage devices may include two storage devices, three storage devices, or at least five storage devices.

The first to fourth storage devices 321_1 to 321_4 may store data used by a plurality of users. In an example embodiment, the first to fourth storage devices 321_1 to 321_4 may be any one of various types of storage devices, such as SSDs, embedded universal flash storage (UFS) memory devices, or embedded multi-media cards (eMMCs). Each of the first to fourth storage devices 321_1 to 321_4 may perform an encryption function (for example, self-encrypting drive (SED)), and accordingly, data to be stored in the first to fourth storage devices 321_1 to 321_4 may be encrypted and then stored.

In an example embodiment, the first to fourth storage devices 321_1 to 321_4 may include the first to third user storage spaces USS1 to USS3 allocated to each of a plurality of users. The first to third user storage spaces USS1 to USS3 may store user data used by each of a plurality of users.

In the example embodiment of FIG. 3, the computing device 310 includes the first to third virtual machines VM1 to VM3 that perform operations for the first to third users, and thus, the first to fourth storage devices 321_1 to 321_4 may include the first to third user storage spaces USS1 to USS3. In some example embodiments, the first user storage space USS1 may be allocated to the first storage device 321_1 and the second storage device 321_2, the second user storage space USS2 may be allocated to the first storage device 321_1, the third storage device 321_3, and the fourth storage device 321_4, and the third user storage space USS3 may be allocated to the second storage device 321_2, the third storage device 321_3, and the fourth storage device 321_4. As such, any one user storage space may not be allocated within one storage device, and any one user storage space may not be allocated within all storage devices.

The controller 322 may control the overall operation of the storage system 320. The controller 322 may operate based on information and a request, which are received from the computing device 310.

In an example embodiment, the controller 322 may receive mapping information from the computing device 310.

The mapping information may be information about the first to third user storage spaces USS1 to USS3 and may indicate which of the first to $n^{th}$ user devices 100_1 to **100_*n* uses the first to third user storage spaces USS1 to USS3, and which of the first to fourth storage devices 321_1 to 321_4 contain the first to third user storage spaces USS1 to USS3**.

In an example embodiment, the mapping information may include at least one of user storage space identification information, computing device identification information, virtual machine identification information, storage system identification information, storage device identification information, and logic block address information.

The user storage space identification information may be information that identifies the first to third user storage spaces USS1 to USS3.

The computing device identification information may be information that identifies which of the plurality of computing devices included in the cloud system 300 is a computing device including a virtual machine that processes a request by a user using a specific user storage space.

The virtual machine identification information may be information that identifies which of the first to third virtual machines VM1 to VM3 included in the computing device 310 is a virtual machine that processes a request by a user using a specific user storage space.

The storage system identification information may be information that identifies which of the plurality of storage systems included in the cloud system 300 is a storage system including a specific user storage space.

The storage device identification information may be information that identifies which of the first to fourth storage devices 321_1 to 321_4 is a storage device including a specific user storage space.

The logic block address information may be information indicating a logic block address in which a specific user storage space is located in the first to fourth storage devices 321_1 to 321_4.

An example of mapping information is described later with reference to FIG. 4.

In an example embodiment, when receiving mapping information, the controller 322 may generate a user key, based on the mapping information (or the controller 322 may generate a user key, based on the mapping information, in response to the controller 322 receiving mapping information).

The user key may be a key used to encrypt and decrypt user data. The first to fourth storage devices 321_1 to 321_4 may encrypt user data by using user keys and store the encrypted user data therein. In addition, the first to fourth storage devices 321_1 to 321_4 may decrypt the encrypted user data by using user keys and transmit the decrypted user data to the outside.

In an example embodiment, the controller 322 may generate different user keys for each of the first to third user storage spaces USS1 to USS3, based on mapping information. For example, the controller 322 may generate different user keys, one of which is used to encrypt user data to be stored in the first user storage space USS1, and the other of which is used to encrypt user data to be stored in the second user storage space USS2.

An example of a user key corresponding to mapping information is described later with reference to FIG. 4.

In an example embodiment, the controller 322 may manage user data stored in the first to fourth storage devices 321_1 to 321_4 by using mapping information and user keys.

The controller 322 may determine, by using mapping information, which logic block address within which of the first to fourth storage devices 321_1 to 321_4 stores user data corresponding to a request received from the computing device 310.

In addition, the controller 322 may encrypt user data to be stored in the first to fourth storage devices 321_1 to 321_4 by using user keys and decrypt the encrypted user data stored in the first to fourth storage devices 321_1 to 321_4 by using user keys.

In an example embodiment, the controller 322 may receive a data write request from the computing device 310. The data write request may be a request to store write data in the first to fourth storage devices 321_1 to 321_4.

In some example embodiments, when receiving the data write request, the controller 322 may determine which of the first to third virtual machines VM1 to VM3 included in the computing device 310 is a virtual machine that has transmitted the data write request (or the controller 322 may determine which of the first to third virtual machines VM1 to VM3 included in the computing device 310 is a virtual machine that has transmitted the data write request, in response to the controller 322 receiving the data write request). The controller 322 may select a user key used to encrypt user data to be stored in user storage space used by the virtual machine that has transmitted the data write request. The controller 322 may encrypt write data corresponding to the data write request by using the selected user key.

For example, when the virtual machine that has transmitted the data write request is the first virtual machine VM1, the controller 322 may encrypt the write data by using a user key used to encrypt user data to be stored in the first user storage space USS1 (or the controller 322 may encrypt the write data by using a user key used to encrypt user data to be stored in the first user storage space USS1, based on the virtual machine that has transmitted the data write request being the first virtual machine VM1).

Next, the controller 322 may determine, based on mapping information, where the user storage space, in which the encrypted write data is to be stored, exists among the first to fourth storage devices 321_1 to 321_4. The controller 322 may write the encrypted write data to the first to fourth storage devices 321_1 to 321_4, based on a result of the determination.

For example, when the virtual machine that has transmitted the data write request is the first virtual machine VM1, the controller 322 may determine that the first user storage space USS1 exists in the first storage device 321_1 and the second storage device 321_2, based on mapping information (or the controller 322 may determine that the first user storage space USS1 exists in the first storage device 321_1 and the second storage device 321_2, based on mapping information, based on the virtual machine that has transmitted the data write request being the first virtual machine VM1). The controller 322 may write the encrypted write data to any one of the first storage device 321_1 and the second storage device 321_2.

In an example embodiment, the controller 322 may receive a data read request from the computing device 310. The data read request may be a request to read read data from the first to fourth storage devices 321_1 to 321_4.

In some example embodiments, when receiving the data read request, the controller 322 may determine which of the first to third virtual machines VM1 to VM3 included in the computing device 310 is a virtual machine that has transmitted the data read request (or the controller 322 may determine which of the first to third virtual machines VM1 to VM3 included in the computing device 310 is a virtual machine that has transmitted the data read request, in response to the controller 322 receiving the data read request). The controller 322 may determine, based on mapping information, where user storage space, which is used by the virtual machine that has transmitted the data read request, exists among the first to fourth storage devices 321_1 to 321_4. The controller 322 may read encrypted read data corresponding to the data read request from the first to fourth storage devices 321_1 to 321_4, based on a result of the determination.

For example, when the virtual machine that has transmitted the data read request is the first virtual machine VM1, the controller 322 may determine that the first user storage space USS1 exists in the first storage device 321_1 and the second storage device 321_2 (or the controller 322 may determine that the first user storage space USS1 exists in the first storage device 321_1 and the second storage device 321_2, based on the virtual machine that has transmitted the data write request being the first virtual machine VM1). The controller 322 may read the encrypted read data from any one of the first storage device 321_1 and the second storage device 321_2.

The controller 322 may select a user key used to encrypt user data stored in user storage space used by the virtual machine that has transmitted the data read request. The controller 322 may decrypt the encrypted read data read from the first to fourth storage devices 321_1 to 321_4, by using the selected user key.

For example, when the virtual machine that has transmitted the data read request is the first virtual machine VM1, the controller 322 may decrypt the encrypted read data by using a user key used to encrypt user data stored in the first user storage space USS1 (or the controller 322 may decrypt the encrypted read data by using a user key used to encrypt user data stored in the first user storage space USS1, based on the virtual machine that has transmitted the data read request being the first virtual machine VM1).

The controller 322 may transmit the decrypted read data to the computing device 310.

In an example embodiment, the controller 322 may determine whether to encrypt user data by using a user key, based on setting of whether to use an encryption function by each of a plurality of users.

The setting of whether to use the encryption function may be setting of whether to encrypt user data before storing the user data in the first to fourth storage devices 321_1 to 321_4.

In some example embodiments, when set to use the encryption function, the controller 322 may encrypt write data as described above and store the encrypted write data in the first to fourth storage devices 321_1 to 321_4. In addition, when set to use the encryption function, the controller 322 may decrypt read data as described above and transmit the decrypted read data to the computing device 310 (or the controller 322 may decrypt read data as described above and transmit the decrypted read data to the computing device 310, based on the controller 322 being set to use the encryption function).

In some example embodiments, when set not to use the encryption function, the controller 322 may not encrypt write data corresponding to a data write request and may store the write data in the first to fourth storage devices 321_1 to 321_4 (or the controller 322 may not encrypt write data corresponding to a data write request and may store the write data in the first to fourth storage devices 321_1 to 321_4, based on the controller 322 not being set to use the encryption function). In addition, when set not to use the encryption function, the controller 322 may not decrypt read data corresponding to a data read request and transmit the read data to the computing device 310 (or the controller 322 may not decrypt read data corresponding to a data read request and transmit the read data to the computing device 310, based on the controller 322 not being set to use the encryption function).

In an example embodiment, when receiving a user withdrawal request from the computing device 310, the controller 322 may remove mapping information, user keys, and user data, which correspond to the user withdrawal request (or the controller 322 may remove mapping information, user keys, and user data, which correspond to the user withdrawal request, in response to the controller 322 receiving a user withdrawal request from the computing device 310). In some example embodiments, the user withdrawal request may be received through a non-volatile memory express (NVMe)-type command, a dataset management (DSM) command, etc.

In some example embodiments, when receiving the user withdrawal request, the controller 322 may check information related to a user who is the subject of the user withdrawal request, and may remove all information related to the user (or the controller 322 may check information related to a user who is the subject of the user withdrawal request, and may remove all information related to the user, in response to the controller 322 receiving the user withdrawal request).

For example, when receiving a user withdrawal request related to the first user, the controller 322 may remove information related to the first user among mapping information, a user key used to encrypt the first user storage space USS1, and user data stored in the first user storage space USS1 (or the controller 322 may remove information related to the first user among mapping information, a user key used to encrypt the first user storage space USS1, and user data stored in the first user storage space USS1, in response to the controller 322 receiving a user withdrawal request related to the first user).

The memory 323 may store data used by the controller 322.

In an example embodiment, the memory 323 may store mapping information. In some example embodiments, when receiving mapping information from the computing device 310, the memory 323 may store the mapping information therein (or the memory 323 may store the mapping information therein, in response to the memory 323 receiving mapping information from the computing device 310). The mapping information stored in the memory 323 may be read by the controller 322 and used for various operations of the controller 322.

The memory 323 may include volatile memory, such as static random access memory (SRAM), dynamic random access memory (DRAM), etc. Therefore, like a case where the storage system 320 is reset or rebooted, when power supply is interrupted and then resumed, all data stored in the memory 323 may be removed.

In an example embodiment, when the storage system 320 is reset or rebooted, the controller 322 may transmit a mapping information request to the computing device 310 (or the controller 322 may transmit a mapping information request to the computing device 310, in response to the storage system 320 being reset or rebooted). In some example embodiments, the controller 322 may transmit the mapping information request to the computing device 310 by using a CLI, RESTful API, etc.

The mapping information request may be a request to transmit mapping information. In some example embodiments, when the storage system 320 is reset or rebooted, all mapping information stored in the memory 323 is removed, and thus, the controller 322 may transmit a mapping information request to the computing device 310 to re-obtain mapping information (or all mapping information stored in the memory 323 is removed, and thus, the controller 322 may transmit a mapping information request to the computing device 310 to re-obtain mapping information, in response to the storage system being reset or rebooted). In response to receiving the mapping information request, the computing device 310 may transmit the mapping information. Accordingly, the controller 322 may receive the mapping information from the computing device 310.

In some example embodiments, when the storage system 320, according to some example embodiments of inventive concepts described above, user data stored in the storage system 320 may be safely managed (or may be managed) by receiving mapping information, generating a user key, based on the received mapping information, and managing user data by using the mapping information and the user key.

FIG. 4 is a diagram of an example of mapping information and user keys, which are used in a storage system, according to an example embodiment.

Referring to FIG. 4, an example of mapping information and user keys, which are used in the cloud system 300 as shown in FIG. 3, may be checked. In some example embodiments, the mapping information in FIG. 4 may be an example embodiment in which the computing device 310 of FIG. 3 is a first computing device 310 and the storage system 320 is a first storage system 320.

The mapping information may include user storage space identification information USS ID, computing device identification information CD ID, virtual machine identification information VM ID, storage system identification information SS ID, storage device identification information SD ID, and logic block address information LBA.

The user storage space identification information USS ID of the first user storage space USS1 may be 1. A request for the first user storage space USS1 is transmitted from the first virtual machine VM1 of the first computing device 310, and thus, the computing device identification information CD ID corresponding to the first user storage space USS1 may be all 1, and the virtual machine identification information VM ID corresponding to the first user storage space USS1 may be all 1. The first user storage space USS1 is allocated to the first storage device 321_1 and the second storage device 321_2 within the first storage system 320, and thus, the storage system identification information SS ID corresponding to the first user storage space USS1 may be all 1, and the storage device identification information SD ID corresponding to the first user storage space USS1 may be respectively 1 and 2. The first user storage space USS1 is located in the uppermost logic block of the first storage device 321_1 and the second storage device 321_2, and thus, the logic block address information LBA corresponding to the first user storage space USS1 may all be 0 to 0x0FFF. User keys stored in the first user storage space USS1 may be A1 and A2.

The user storage space identification information USS ID of the second user storage space USS2 may be 2. A request for the second user storage space USS2 is transmitted from the second virtual machine VM2 of the first computing device 310, and thus, the computing device identification information CD ID corresponding to the second user storage space USS2 may be all 1, and the virtual machine identification information VM ID corresponding to the second user storage space USS2 may be all 2. The second user storage space USS2 is allocated to the first storage device 321_1, the third storage device 321_3, and the fourth storage device 321_4 within the first storage system 320, and thus, the storage system identification information SS ID corresponding to the second user storage space USS2 may be all 1, and the storage device identification information SD ID corresponding to the second user storage space USS2 may be respectively 1, 3, and 4. The second user storage space USS2 is located in the second top logic block of the first storage device 321_1 and the uppermost logic block of the third storage device 321_3 and the fourth storage device 321_4, and thus, the logic block address information LBA of the second user storage space USS2, which corresponds to the first storage device 321_1, may be 0x1000 to 0x1FFF, and the logic block address information LBA of the second user storage space USS2, which corresponds to the third storage device 321_3 and the fourth storage device 321_4, may be all 0 to 0x0FFF. User keys stored in the second user storage space USS2 may be B1, B2, and B3.

The user storage space identification information USS ID of the third user storage space USS3 may be 3. A request for the third user storage space USS3 is transmitted from the third virtual machine VM3 of the first computing device

310, and thus, the computing device identification information CD ID corresponding to the third user storage space USS3 may be all 1, and the virtual machine identification information VM ID corresponding to the third user storage space USS3 may be all 3. The third user storage space USS3 is allocated to the second storage device 321_2, the third storage device 321_3, and the fourth storage device 321_4 within the first storage system 320, and thus, the storage system identification information SS ID corresponding to the third user storage space USS3 may be all 1, and the storage device identification information SD ID corresponding to the third user storage space USS3 may be respectively 2, 3, and 4. The third user storage space USS3 is located in the second top logic block of the first storage device 321_1, the third storage device 321_3, and the fourth storage device 321_4, and thus, the logic block address information LBA corresponding to the third user storage space USS3 may be all 0x1000 to 0x1FFF. User keys stored in the third user storage space USS3 may be C1, C2, and C3.

Figure 5:
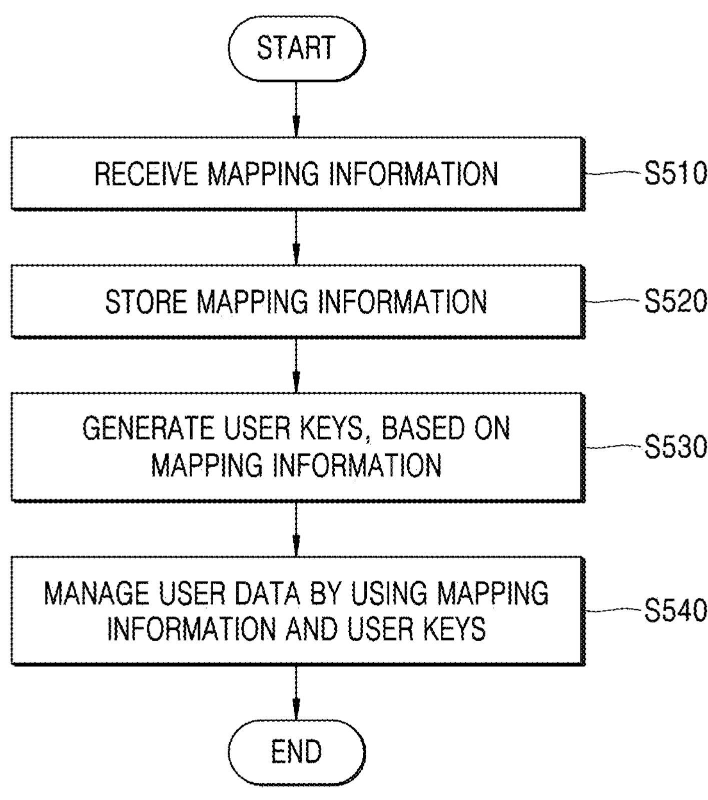
FIG. 5 is a flowchart showing an operating method of a storage system, according to an example embodiment.

FIG. 5 is a flowchart showing an operating method of a storage system, according to an example embodiment.

Referring to FIG. 5, in operation S510, the storage system 320 may receive mapping information. The storage system 320 may receive mapping information from the computing device 310 through the controller 322. In some example embodiments, when receiving a user sign-up request from a user device, the computing device 310 may generate mapping information and transmit the generated mapping information to the storage system 320 (or the computing device 310 may generate mapping information and transmit the generated mapping information to the storage system 320, in response to the computing device 310 receiving a user sign-up request from a user device).

In operation S520, the storage system 320 may store the mapping information. The storage system 320 may store the received mapping information in the memory 323 through the controller 322.

In operation S530, the storage system 320 may generate user keys, based on the mapping information. The storage system 320 may generate different user keys for each of the first to third user storage spaces USS1 to USS3 through the controller 322, based on the mapping information.

In operation S540, the storage system 320 may manage user data by using the mapping information and the user keys. The storage system 320 may encrypt write data corresponding to a data write request received from the computing device 310 through the controller 322, by using the mapping information and the user keys. In addition, the storage system 320 may decrypt read data corresponding to a data read request received from the computing device 310 through the controller 322, by using the mapping information and the user keys.

Figure 6:
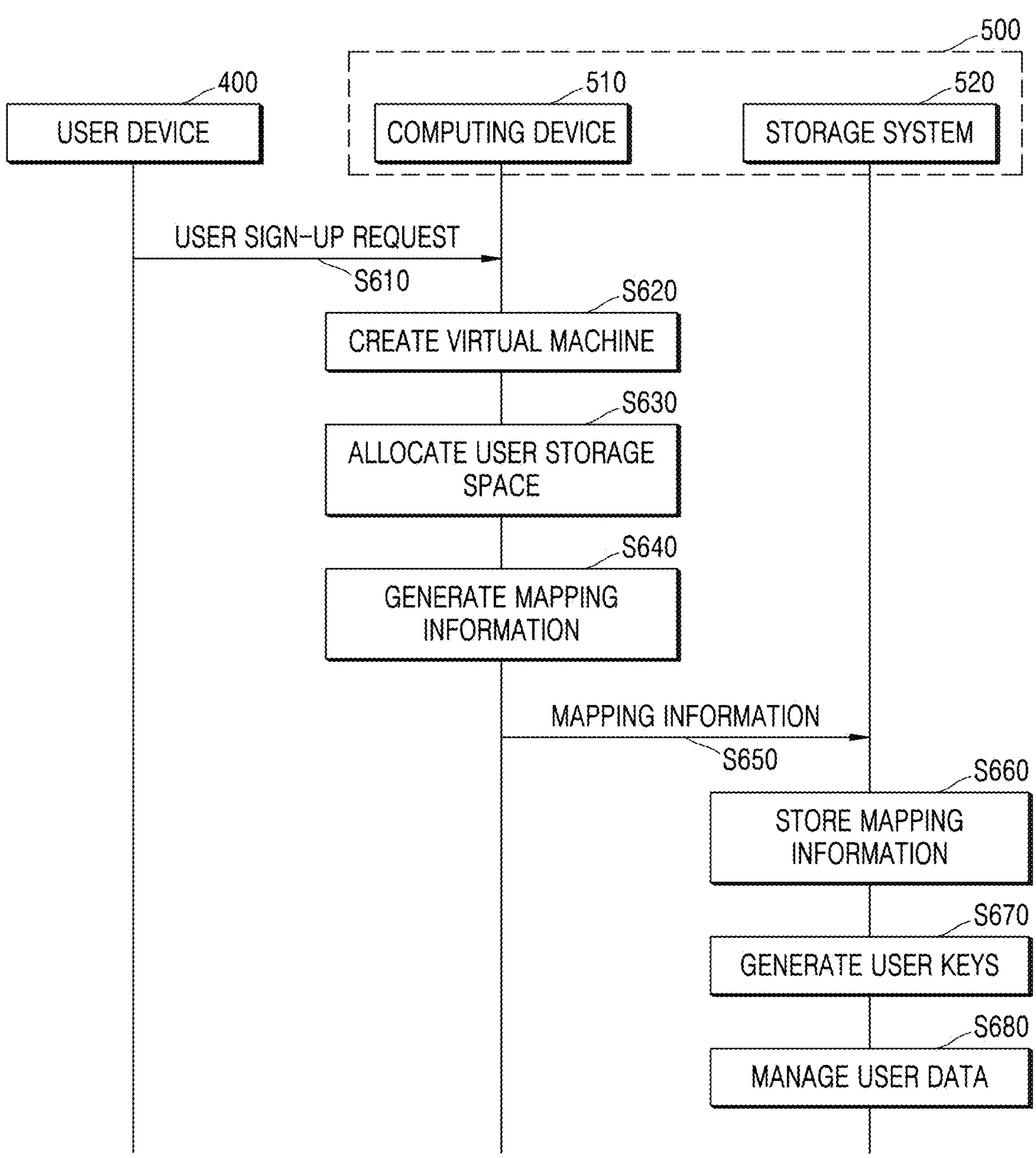
FIG. 6 is a flowchart showing an operating method when a new user signs up in a cloud system, according to an example embodiment.

FIG. 6 is a flowchart showing an operating method when a new user signs up in a cloud system, according to an example embodiment.

Referring to FIG. 6, in operation S610, a user device 400 may transmit a user sign-up request to a computing device 510. The computing device 510 may receive, from the user device 400, a request to allocate space for a new user to store data.

In operation S620, the computing device 510 may create a virtual machine. The computing device 510 may create a virtual machine to process a request received from the user device 400, in response to receiving the user sign-up request from the user device 400.

In operation S630, the computing device 510 may allocate user storage space. The computing device 510 may allocate, within a storage system 520, user storage space in which user data is to be stored, in response to receiving the user sign-up request from the user device 400.

In operation S640, the computing device 510 may generate mapping information. The computing device 510 may generate mapping information including information about the user storage space allocated in operation S630.

In operation S650, the computing device 510 may transmit the mapping information to the storage system 520. The storage system 520 may receive, from the computing device 510, the mapping information generated according to the user sign-up request.

In operation S660, the storage system 520 may store the mapping information. The operation in operation S660 of FIG. 6 may be the same as the operation in operation S520 of FIG. 5.

In operation S670, the storage system 520 may generate user keys. The operation in operation S670 of FIG. 6 may be the same as the operation in operation S560 of FIG. 5.

In operation S680, the storage system 520 may manage user data. The operation in operation S680 of FIG. 6 may be the same as the operation in operation S540 of FIG. 5.

Figure 7:
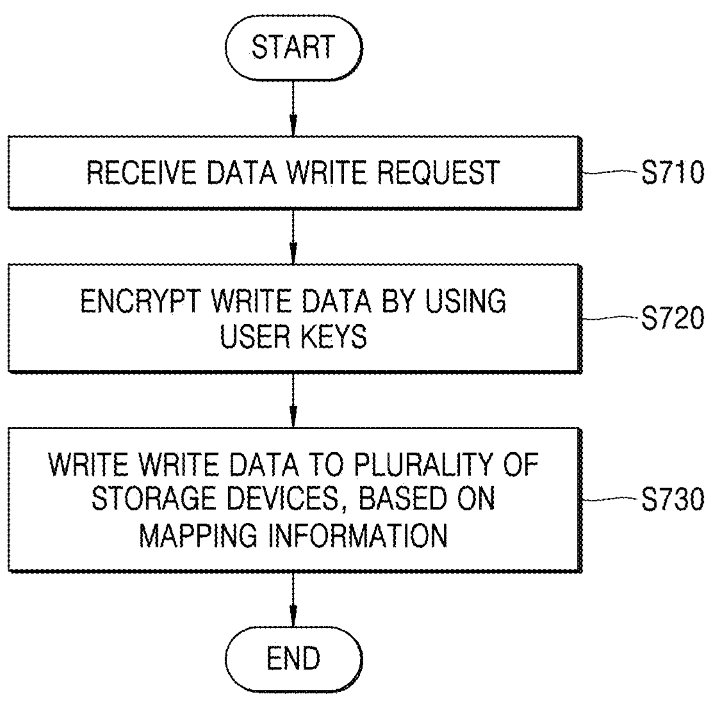
FIG. 7 is a flowchart showing an operating method when data is written to a storage system, according to an example embodiment.

FIG. 7 is a flowchart showing an operating method when data is written to a storage system, according to an example embodiment.

Referring to FIG. 7, in operation S710, the storage system 320 may receive a data write request. The storage system 320 may receive, from the computing device 310, a data write request generated by a user device. The data write request may include write data.

In operation S720, the storage system 320 may encrypt the write data by using user keys. The storage system 320 may encrypt the write data by using user keys used to encrypt user storage space used by the user device that has transmitted the data write request through the controller 322.

In operation S730, the storage system 320 may write the write data to a plurality of storage devices (or alternatively referred to as a plurality of non-transitory storage devices), based on mapping information. The storage system 320 may determine, based on the mapping information, where the user storage space, in which the encrypted write data is to be stored, exists among the first to fourth storage devices (or non-transitory storage devices) 321_1 to 321_4 through the controller 322, and may write the encrypted write data to the first to fourth storage devices 321_1 to 321_4, based on a result of the determination.

Figure 8:
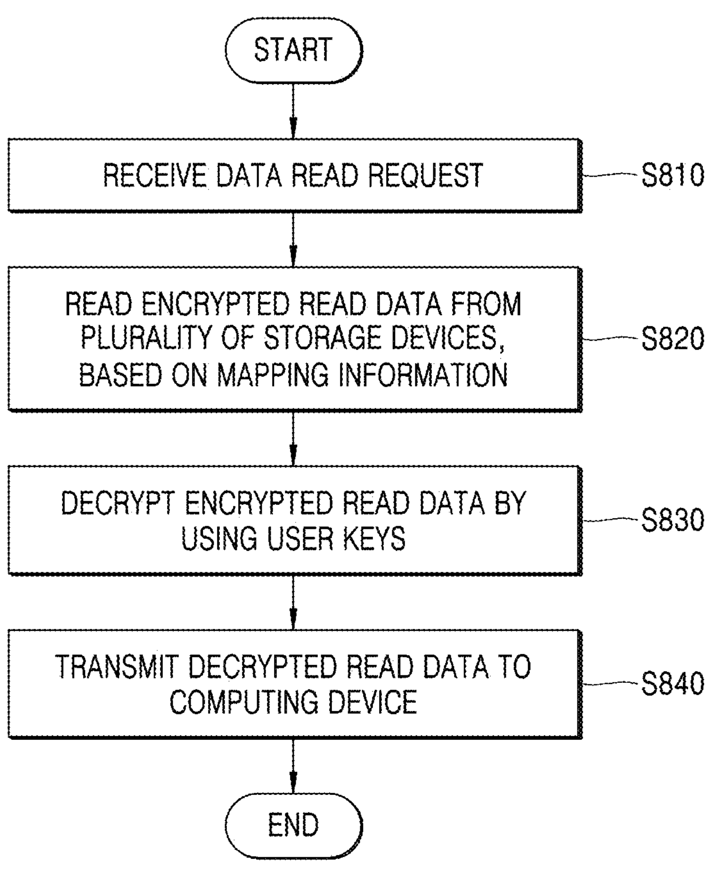
FIG. 8 is a flowchart showing an operating method when data is read from a storage system, according to an example embodiment.

FIG. 8 is a flowchart showing an operating method when data is read from a storage system, according to an example embodiment.

Referring to FIG. 8, in operation S810, the storage system 320 may receive a data read request. The storage system 320 may receive, from the computing device 310, a data read request generated by a user device. The data read request may include information about read data.

In operation S820, the storage system 320 may read encrypted read data from the plurality of storage devices, based on mapping information. The storage system 320 may determine, based on mapping information, where user storage space, in which the encrypted read data is stored, exists among the first to fourth storage devices 321_1 to 321_4 through the controller 322, and may read the encrypted read data to from the first to fourth storage devices 321_1 to 321_4, based on a result of the determination.

In operation S830, the storage system 320 may decrypt the encrypted read data by using user keys. The storage system 320 may decrypt the encrypted read data by using user keys used to encrypt user storage space used by the user device that has transmitted the data read request through the controller 322.

In operation S840, the storage system 320 may transmit the decrypted read data to the computing device 310. The storage system 320 may transmit the decrypted read data to the computing device 310 through the controller 322, and accordingly, the computing device 310 may transmit the decrypted read data to the user device.

Figure 9:
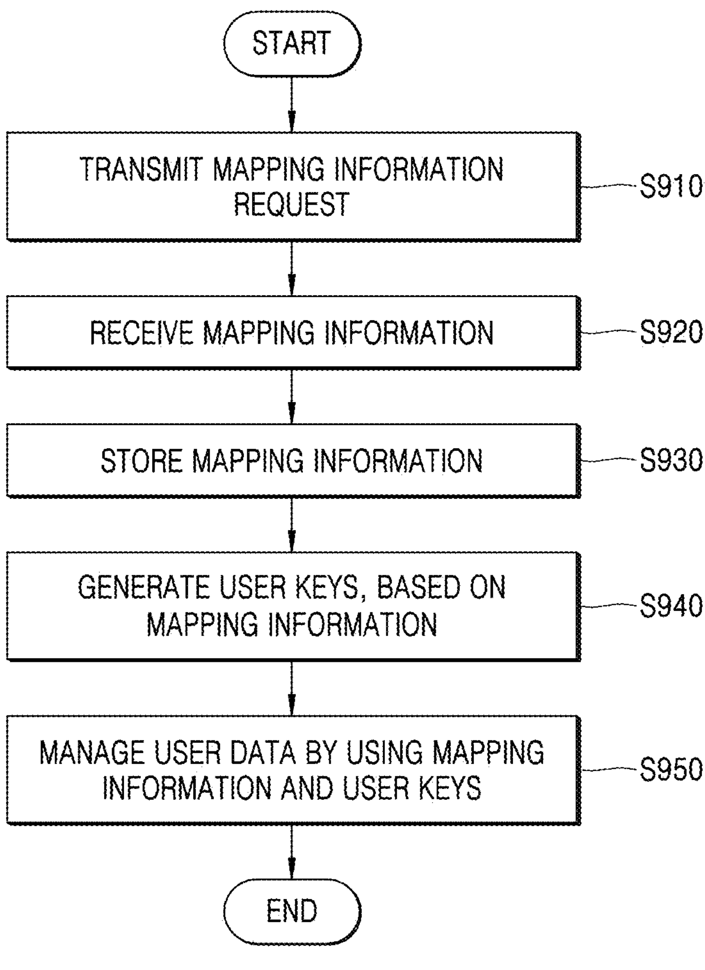
FIG. 9 is a flowchart showing an operating method when a storage system is reset or rebooted, according to an example embodiment.

FIG. 9 is a flowchart showing an operating method when a storage system is reset or rebooted, according to an example embodiment.

Referring to FIG. 9, in operation S910, the storage system 320 may transmit a mapping information request. In some example embodiments, when the storage system 320 is reset or rebooted, all mapping information stored in the memory 323 is removed, and thus, the storage system 320 may transmit a mapping information request to the computing device 310 through the controller 322 (or all mapping information stored in the memory 323 is removed, and thus, the storage system 320 may transmit a mapping information request to the computing device 310 through the controller 322, in response to the storage system 320 being reset or rebooted).

In operation S920, the storage system 320 may receive mapping information. The operation in operation S920 of FIG. 9 may be the same as the operation in operation S510 of FIG. 5.

In operation S930, the storage system 320 may store the mapping information. The operation in operation S930 of FIG. 9 may be the same as the operation in operation S520 of FIG. 5.

In operation S940, the storage system 320 may generate user keys, based on the mapping information. The operation in operation S940 of FIG. 9 may be the same as the operation in operation S530 of FIG. 5.

In operation S950, the storage system 320 may manage user data by using the mapping information and the user keys. The operation in operation S950 of FIG. 9 may be the same as the operation in operation S540 of FIG. 5.

Figure 10:
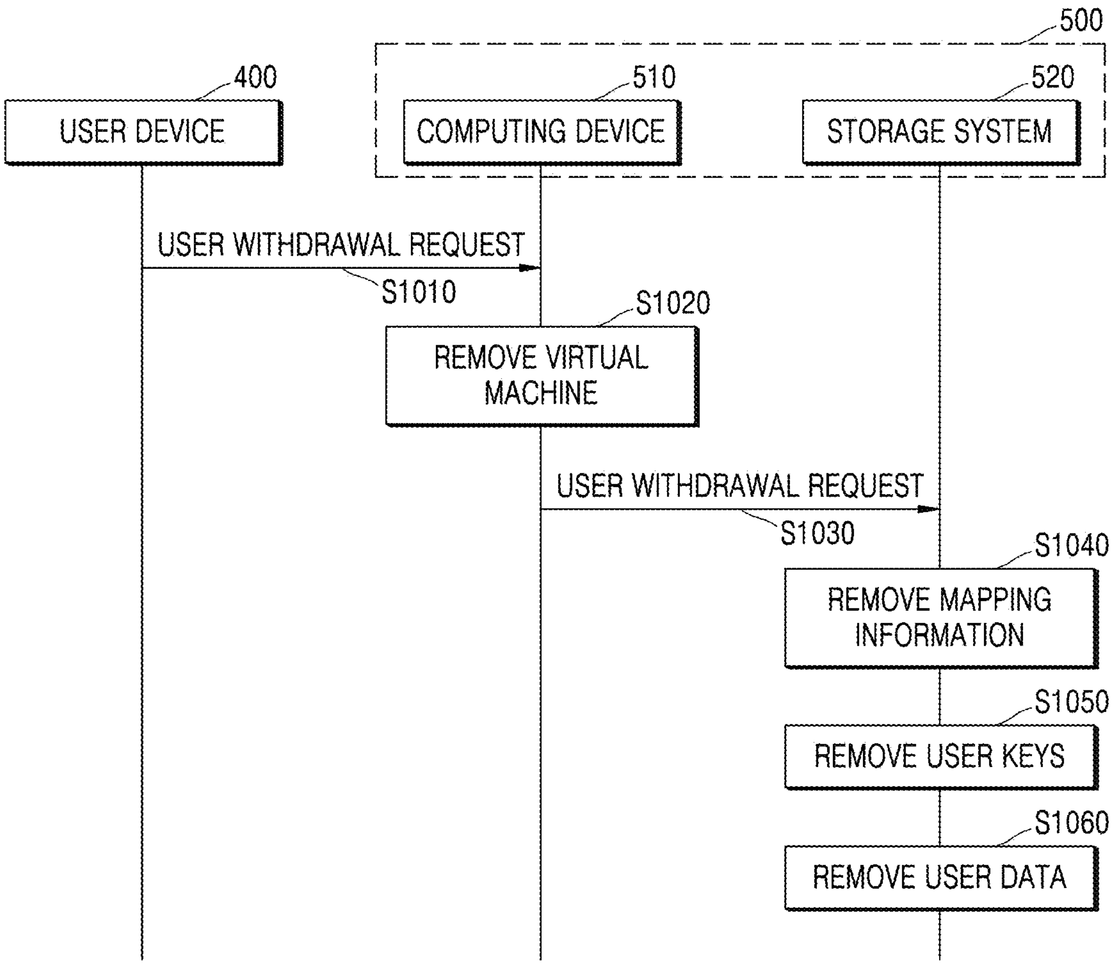
FIG. 10 is a flowchart showing an operating method when a user withdraws from a cloud system, according to an example embodiment.

FIG. 10 is a flowchart showing an operating method when a user withdraws from a cloud system, according to an example embodiment.

Referring to FIG. 10, in operation S1010, the user device 400 may transmit a user withdrawal request to the computing device 510. The computing device 510 may receive, from the user device 400, a request indicating that the existing user is no longer using a cloud system 500.

In operation S1020, the computing device 510 may remove a virtual machine. The computing device 510 may remove therefrom the virtual machine that processes a request related to a user, which corresponds to the user withdrawal request.

In operation S1030, the computing device 510 may transmit the user withdrawal request to the storage system 520. The storage system 520 may receive, from the computing device 510, the user withdrawal request transmitted from the user device 400.

In operation S1040, the storage system 520 may remove mapping information. The storage system 520 may remove mapping information related to user storage space, which corresponds to the user withdrawal request, through the controller 322.

In operation S1050, the storage system 520 may remove user keys. The storage system 520 may remove user keys used to encrypt user data stored in the user storage space through the controller 322, the user keys corresponding to the user withdrawal request.

In operation S1060, the storage system 520 may remove user data. The storage system 520 may remove all user data stored in the user storage space, which corresponds to the user withdrawal request, through the controller 322.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While inventive concepts have been particularly shown and described with reference to example embodiments thereof, it will be understood that various changes in form and details may be made therein without departing from the spirit and scope of the following claims.

What is claimed is:

1. A storage system comprising:

a plurality of storage devices including a plurality of user storage spaces allocated to each of a plurality of users;

a controller configured to receive mapping information about the plurality of user storage spaces, from an external computing device configured to perform an operation for each of the plurality of users through a plurality of virtual machines; and a memory configured to store the mapping information, wherein the controller is configured to generate a user key for each of the plurality of user storage spaces, based on the mapping information, in response to the controller receiving the mapping information, wherein each user key is unique to each of the plurality of user storage spaces, and wherein the controller is further configured to manage user data stored in the plurality of storage devices by using the mapping information and the user keys.

2. The storage system of claim 1, wherein the mapping information comprises at least one of user storage space identification information, computing device identification information, virtual machine identification information, storage system identification information, storage device identification information, and logic block address information.

3. The storage system of claim 1, wherein the controller is configured to encrypt write data corresponding to the data write request by using the user keys, and write the encrypted write data to the plurality of storage devices, based on the mapping information, in response to the controller receiving a data write request from the external computing device.

4. The storage system of claim 1, wherein the controller is configured to read encrypted read data corresponding to the data read request, from the plurality of storage devices, based on the mapping information, decrypt the encrypted read data by using the user keys, and transmit the decrypted read data to the external computing device, in response to the controller receiving a data read request from the external computing device.

5. The storage system of claim 1, wherein the controller is configured to determine whether to encrypt the user data using the user keys, based on encryption function usage setting of each of the plurality of users.

6. The storage system of claim 1, wherein the controller is configured to remove the mapping information, the user keys, and the user data corresponding to a user withdrawal request, in response to the controller receiving the user withdrawal request from the external computing device.

7. The storage system of claim 1, wherein the controller is configured to transmit a mapping information request to the external computing device and receive the mapping information from the external computing device in response to the storage system being reset or rebooted.

8. A storage system comprising:

a plurality of storage devices comprising a plurality of user storage spaces allocated to each of a plurality of users;

a controller configured to transmit a mapping information request to an external computing device that performs an operation for each of the plurality of users through a plurality of virtual machines, in response to the storage system being reset or rebooted, receive mapping information about the plurality of user storage spaces, from the external computing device, generate a user key for each of the plurality of user storage spaces, based on the mapping information, wherein each user key is unique to each of the plurality of user storage spaces, and manage user data stored in the plurality of storage devices by using the mapping information and the user keys; and a memory storing the mapping information.

9. The storage system of claim 8, wherein the mapping information comprises at least one of user storage space identification information, computing device identification information, virtual machine identification information, storage system identification information, storage device identification information, and logic block address information.

10. The storage system of claim 8, wherein the controller is configured to encrypt write data corresponding to the data write request by using the user keys, and write the encrypted write data to the plurality of storage devices, based on the mapping information, in response to the controller receiving a data write request from the external computing device.

11. The storage system of claim 8, wherein the controller is configured to read encrypted read data corresponding to the data read request, from the plurality of storage devices, based on the mapping information, decrypt the encrypted read data by using the user keys, and transmit the decrypted read data to the external computing device, in response to the controller receiving a data read request from the external computing device.

12. The storage system of claim 8, wherein the controller is configured to determine whether to encrypt the user data using the user keys, based on encryption function usage setting of each of the plurality of users.

13. The storage system of claim 8, wherein the controller is configured to remove the mapping information, the user keys, and the user data corresponding to a user withdrawal request, in response to the controller receiving the user withdrawal request from the external computing device.

14. A cloud system comprising:

a plurality of storage systems configured to store user data of each of a plurality of users; and a plurality of computing devices configured to perform an operation for each of the plurality of users through a plurality of virtual machines and transmit to the plurality of storage systems, mapping information about a plurality of user storage spaces allocated to each of the plurality of users, wherein the plurality of storage systems includes, a plurality of storage devices comprising the plurality of user storage spaces allocated to each of the plurality of users;

a controller configured to generate a user key for each of the plurality of user storage spaces, based on the mapping information, and manage user data stored in the plurality of storage devices by using the mapping information and the user keys, in response to the controller receiving the mapping information, wherein each user key is unique to each of the plurality of user storage spaces; and a memory storing the mapping information.

15. The cloud system of claim 14, wherein the plurality of computing devices are configured to create a virtual machine in response to receiving a user sign-up request from an external user device, allocate a user storage space inside the plurality of storage systems, generate mapping information, and transmit the mapping information to the plurality of storage systems.

16. The cloud system of claim 14, wherein the mapping information comprises at least one of user storage space identification information, computing device identification information, virtual machine identification information, storage system identification information, storage device identification information, and logic block address information.

17. The cloud system of claim 14, wherein the controller is configured to encrypt write data corresponding to the data write request by using the user keys, and write the encrypted write data to the plurality of storage devices, based on the mapping information, in response to the controller receiving a data write request from the plurality of computing devices.

18. The cloud system of claim 14, wherein the controller is configured to read encrypted read data corresponding to the data read request, from the plurality of storage devices, based on the mapping information, decrypt the encrypted read data by using the user keys, and transmit the decrypted read data to the plurality of computing devices, in response to the controller receiving a data read request from the plurality of computing devices.

19. The cloud system of claim 14, wherein the plurality of computing devices are configured to transmit a user withdrawal request to the controller, and wherein the controller is configured to remove the mapping information, the user keys, and the user data corresponding to the user withdrawal request, in response to the controller receiving the user withdrawal request.

20. The cloud system of claim 14, wherein the controller is configured to transmit a mapping information request to the plurality of computing devices in response to the controller receiving the plurality of storage systems are reset or rebooted, and wherein the plurality of computing devices are configured to transmit the mapping information to the controller in response to the controller receiving the mapping information request.

* * * * *